United States Patent [19]
Kelgard

[11] Patent Number: 4,831,993
[45] Date of Patent: May 23, 1989

[54] METHOD OF OPERATING CARBURETTED DUAL-FUEL ENGINES WITH DIESEL PILOT OIL INJECTION

[76] Inventor: Erik Kelgard, 322-8880 No. 1 Road, Richmond, British Columbia, Canada, V7C 4C3

[21] Appl. No.: 138,318
[22] Filed: Dec. 28, 1987
[51] Int. Cl.⁴ .......................................... F02M 21/02
[52] U.S. Cl. ............................. 123/525; 123/27 GE; 123/575
[58] Field of Search ................. 123/525, 27 GE, 577

[56] References Cited

U.S. PATENT DOCUMENTS

| | | | |
|---|---|---|---|
| 4,520,766 | 6/1985 | Akeroyd | 123/577 |
| 4,597,364 | 7/1986 | Young | 123/577 |
| 4,637,353 | 1/1987 | Codrington | 123/27 GE |
| 4,708,094 | 11/1987 | Helmich | 123/27 GE |
| 4,742,801 | 5/1988 | Kelgard | 123/27 GE |

Primary Examiner—E. Rollins Cross
Attorney, Agent, or Firm—Kinzer, Plyer, Dorn, McEachran & Jambor

[57] ABSTRACT

This is concerned with a method of operating a dual-fuel engine, meaning an engine that is supplied with a mixture of gaseous fuel and air which is ignited by an injection of a small amount of so-called pilot oil which is diesel fuel. Additionally the invention is concerned with a method of operation that injects an approximately constant amount of pilot oil regardless of speed variations so as to save fuel at the higher speeds and is specifically applicable or useful with over-the road dual fuel engines, meaning mobile units on trucks, tractors, etc.

2 Claims, 1 Drawing Sheet

METHOD OF OPERATING CARBURETTED DUAL-FUEL ENGINES WITH DIESEL PILOT OIL INJECTION

SUMMARY OF THE INVENTION

This invention is concerned with a so-called dual-fuel engine which is an engine that is supplied with a mixture of gaseous fuel and air that is ignited by the injection of so-called pilot oil which is a small quantity of diesel fuel.

A primary object of the invention is to more efficiently operate dual-fuel engines.

Another object is to operate such an engine in a more efficient manner so that it is specifically applicable to over-the-road engines, such as trucks.

Another object is to electronically control the pilot oil injector in an engine of the above type.

Another object is to delay the time of injection as the speed of the engine decreases.

Another object is an injection procedure whereby the pilot oil starts to burn at the same piston position regardless of speed.

Another object is a method of operating an engine of the above type in which the same quantity of pilot oil is injected over the entire speed range.

Other objects will appear from time to time in the ensuing specification and drawings.

DETAILED DESCRIPTION

Figure 1:
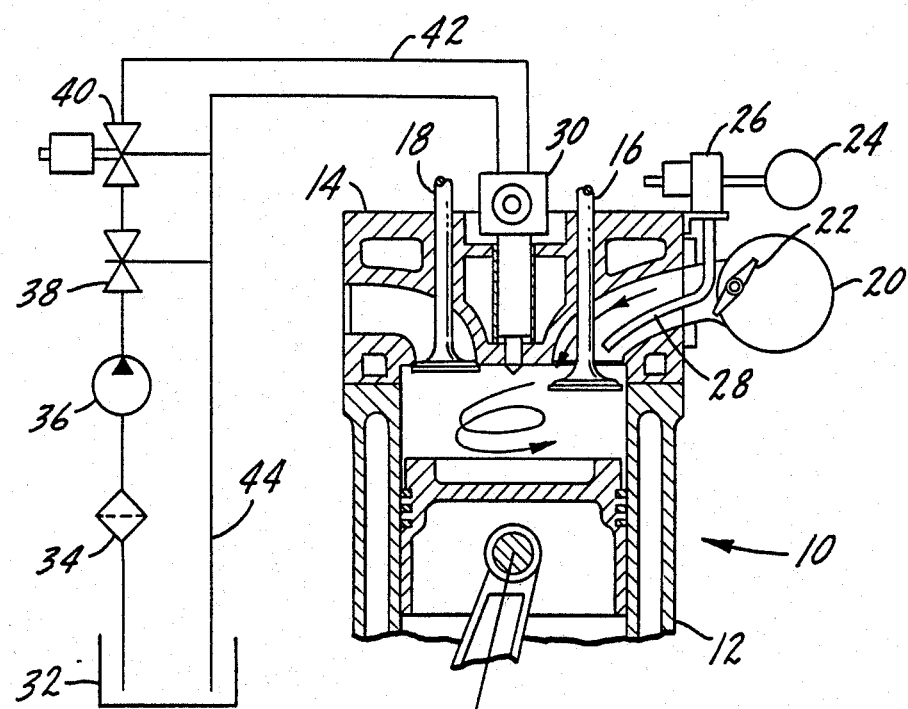
FIG. 1 is a schematic of an engine in accordance with my invention.
Figure 2:
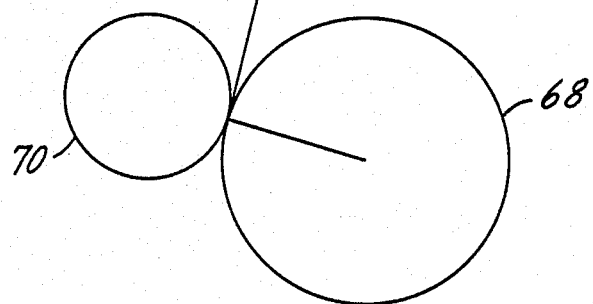
FIG. 2 is a control diagram.
Figure 2:
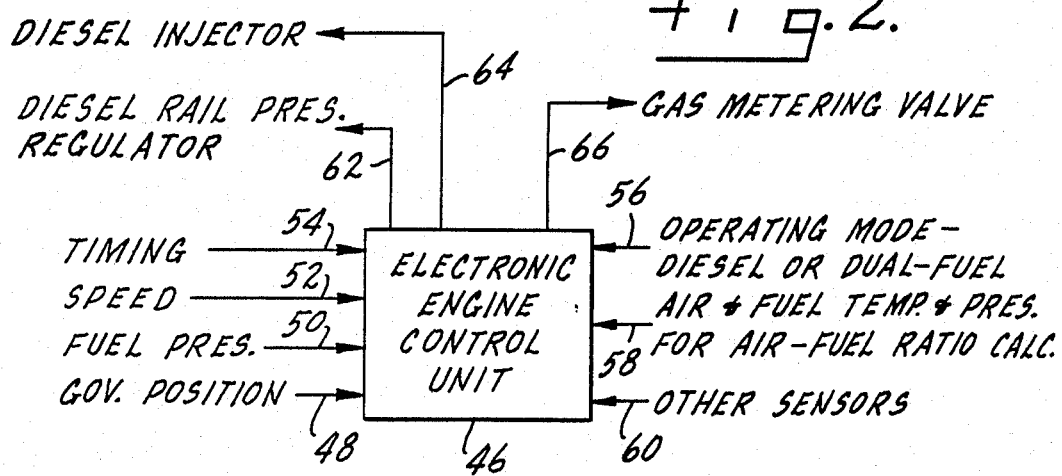

In the drawing an engine is indicated generally at 10 which is a cross section through one cyliner and piston. It should be understood that the engine may have a number of cylinders and pistons, for example six or eight. The cylinder 12 may have a water jacket for cooling purpose and the cylinder head 14 is mounted thereon by conventional head bolts not shown. The cylinder head has an inlet valve 16 and an exhaust valve 18. An inlet manifold is indicated generally at 20 which supplies air through an inlet passage controlled by the inlet valve 16. A conventional butterfly valve 22 controls the air flow to the engine in the case of a normally aspirated engine. For a highly turbocharged engine a wastegate (not shown) would be employed. The gaseous fuel is supplied from a manifold 24 through a metering valve 26 to a gas inlet pipe 28 in the inlet passage with a gas-air mixture beig formed at or around the inlet valve.

The engine has a diesel fuel injector 30 which is shown mounted between the inlet and exhaust valves. And it should be understood that the injector supplies a small quantity of pilot oil after the air-gas mixture is in the cylinder to initiate combustion. A diesel fuel supply 32 of any suitable type provides pilot oil through a filter 34 to a fuel pump 36 and thereafter to a pressure relief valve 38, then to a fuel pressure regulator 40 and thereafter through a supply line 42 to the pilot fuel injector 30. A return line 44 returns excess pilot oil to the supply 32.

The inlet and exhaust valves are camshaft operated in the usual manner. However, the pilot fuel injection is electronically controlled and may have a microprocessor 46 which is an electronic engine control unit with various input and output signals. For example, the inputs on the left side may be the governor position 48, the fuel pressure 50, the speed of the engine 52 and the timing of the engine crankshaft at 54. On the right side typical inputs may be the operating mode, i.e. whether the engine is being operated as a full diesel engine or on the dual-fuel cycle at 56, the air and fuel temperatures and pressures for air-fuel ratio calculations at 58 and other suitable sensors as at 60. Three outputs are shown on top, the first being a diesel rail pressure regulator 62, the diesel injector control 64 for injector 30 and a control to the gas metering valve at 66 which controls gas metering valve 26. These various inputs and outputs may be conventional, for example as explained in U.S. Pat. No. 4,628,818, issued Dec. 16, 1986. The crank angle position or position of the piston may be determined by a crank angle sensor indicated generally at 68 and a similar cam sensor 70 may be used to determine the position of the cams on the crankshaft.

The use, operation, and function of the invention are as follows:

One of the reasons for converting diesel engines to the dual-fuel mode is that there is a significant difference in the cost between diesel fuel and natural gas, the natural gas being the cheaper on an energy basis. The ability, therefore, to reduce the amount of diesel fuel used as pilot oil adds materially to the economics backing the conversion to dual-fuel.

It is well known that the delivery from a jerk type fuel pump is not linear with speed. If, on the one hand, the pump has been adjusted to deliver the minimum required amount of pilot oil at the rated speed the fuel pump will fail to deliver enough oil to cause the injector to open when the engine slows down. If, on the other hand, the pump has been adjusted to deliver the minimum requirement for the injector to work properly at the minimum required speed (idling) the engine, when speed is increased toward the rated RPM, will knock violently due to the additional ignition points throughout the combustion space.

In addition to the problem caused by the variation in fuel delivery with speed discussed above, most jerk pumps are also cam driven and the pump timing is therefore difficult to change. The need to change the injection timing arises when there is a major change in speed. If, to accommodate the ignition delay common for diesel fuels, the timing of injection is advanced this advance will cause the engine to lose efficiency due to early firing when speed is reduced. To save fuel and avoid other troubles with the engine it is therefore desirable that timing should be able to be altered when major changes in speed takes place.

Both the variable delivery problem and the inability to readily change timing can be overcome by the use of an electronic engine control unit in conjunction with unit injectors powered hydraulically.

The injectors may comprise a high-speed solenoid, pressure intensifier, and accumulator nozzle. The fuel quantity received by the injectors is governed by the variable common rail pressure. The microprocessor can be programmed to vary injection timing in consonance with speed and to hold the pilot oil quantity constant regardless of speed changes.

Besides the functions described above, the microprocessor has the capacity to control other functions such as air-fuel ratio, speed control, etc., necessary for good dual-fuel engine operation.

The recommended system for a carbueretted or port-injected dual-fuel engine operates on natural gas with diesel fuel pilot oil injection. As the engine senses speed changes, the microprocessor will change the timing of injection to what it should be dependent upon the speed involved. There will be a certain time of injection when the engine is running at its rated speed. As the engine slows down, the time of pilot oil injection will be retarded so that the injection will start at approximately the same time interval prior to TDC. The quantity of pilot oil will not change but rather will be set constant and will be set by the microprocessor. Thus, injection and the resulting ignition will vary depending upon engine speed. In either case, the length of the time that it takes the fuel to react is the same. The amount of pilot oil injected is set in accordance with low speed and will be generally constant throughout speed changes so that at the high speeds, excess pilot oil is not being injected.

The engine shown on the drawings may be assumed to be either two cycle or four cycle, naturally aspirated or supercharged. And if supercharged it may be either an exhaust driven turbo charger or a crankshaft driven unit.

While the preferred form and several variations of the invention have been shown and suggested, it should be understood that suitable additional modifications, changes, substitutions, and alterations may be made without departing from the invention's fundamental theme.

The embodiments of the invention in which an exclusive property or privilege is claimed are defined as follows:

1. A method of operating a variable speed over-the-road dual-fuel engine having an inlet valve in the cylinder head for the admission of an air-gas mixture and a pilot fuel injector for the injection of a pilot oil quantity in the cylinder to ignite the air-gas mixture, including the steps of supplying an air-gas mixture through the inlet valve, varying the amount of the air-gas mixture supplied through the inlet valve as the speed of the engine varies, supplying a pilot oil quantity through the pilot oil injector, varying the timing of injection of the pilot oil quantity as the speed of the engine varies, injecting an approximately constant quantity of pilot oil as the speed of the engine varies, and setting the quantity of pilot oil injected in accordance with the proper amount necessary at the engine low speed.

2. The method of claim 1 further characterized by and including the step of delaying the time of injection of the pilot oil quantity as the speed of the engine decreases so that the pilot oil will be injected at approximately the same time prior to TDC.

* * * * *